Oct. 5, 1926.

T. DAVIDSON 1,602,339

WAGON

Original Filed Sept. 28, 1923    2 Sheets-Sheet 1

WITNESS:
C.W. Markward

T. Davidson
INVENTOR
BY Victor J. Evans
ATTORNEY

Oct. 5, 1926.
T. DAVIDSON
WAGON
Original Filed Sept. 28, 1923    2 Sheets-Sheet 2
1,602,339
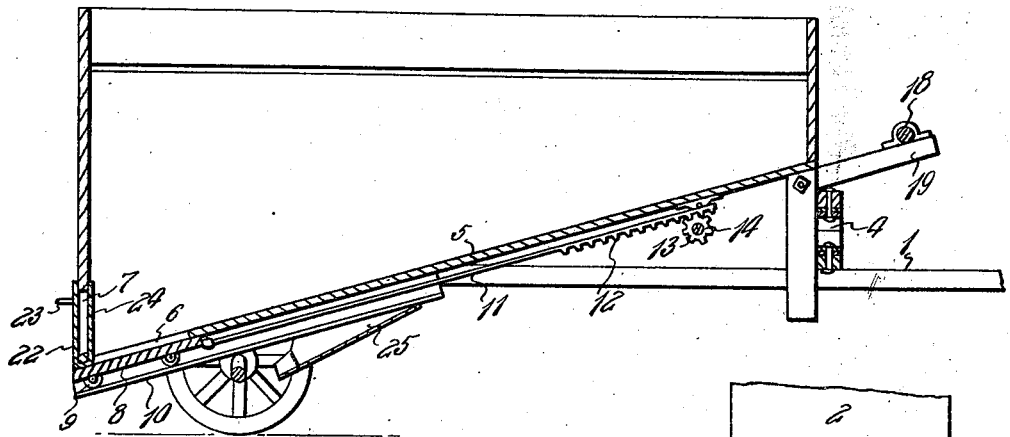
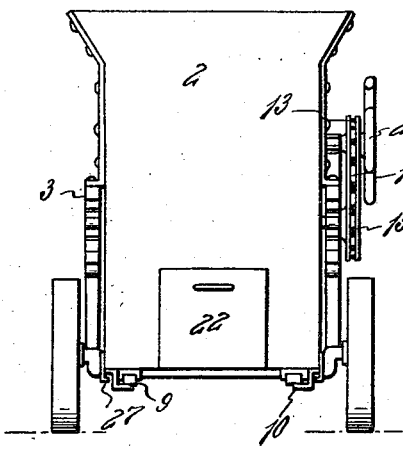
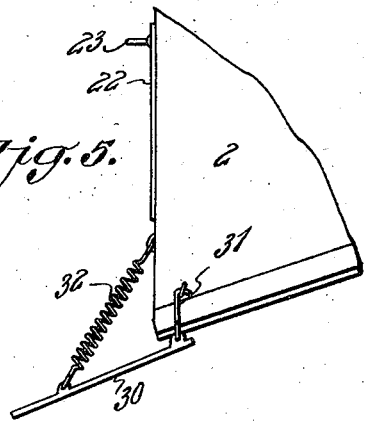
T. Davidson
INVENTOR
BY Victor J. Evans
ATTORNEY
WITNESS:

Patented Oct. 5, 1926.

1,602,339

UNITED STATES PATENT OFFICE.

THOMAS DAVIDSON, OF GLADWYNE, PENNSYLVANIA.

WAGON.

Application filed September 28, 1923, Serial No. 665,460. Renewed March 20, 1926.

This invention relates to an improved wagon, the general object of the invention being to provide means for facilitating the scattering of the contents of the wagon.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a rear end view.

Figure 4 is a longitudinal sectional view.

Figure 5 is a fragmentary view of the rear end of the wagon with the shaker attachment thereon.

Figure 8 is a fragmentary view with parts in section showing how the front spring supports the body.

Figure 1:
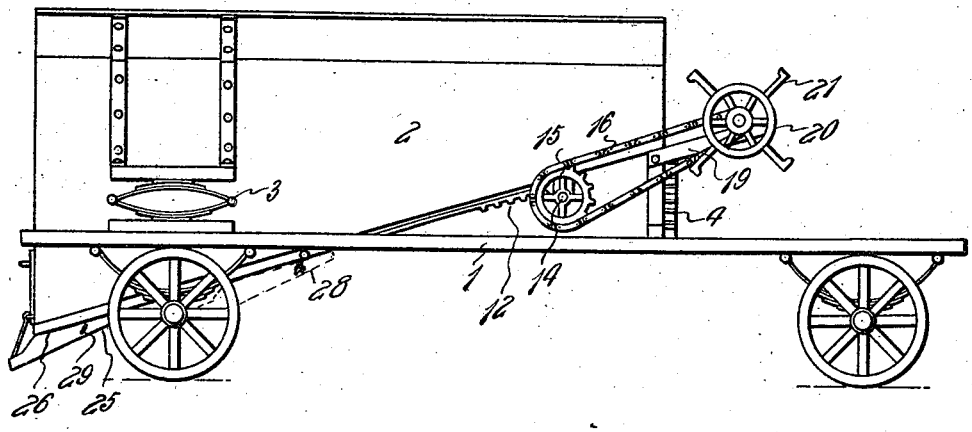
Figure 1 is a side view of the invention.
Figure 2:
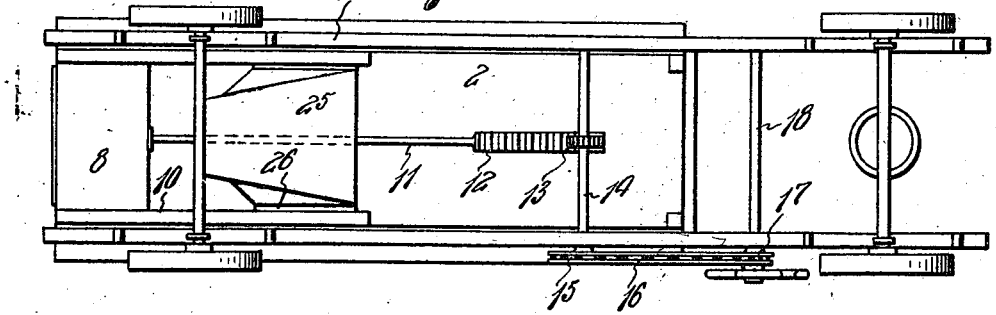
Figure 2 is a bottom plan view.
Figure 7:
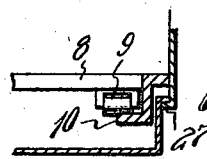
Figure 7 is a fragmentary sectional view of the bottom door and the chute with the means for supporting the same.
Figure 6:
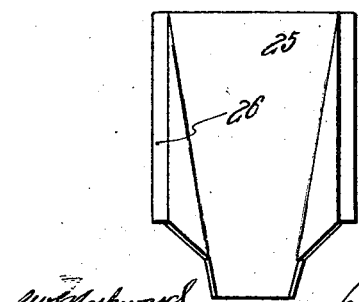
Figure 6 is a plan view of the chute.

In these views, 1 indicates a wheeled truck upon which the body 2 is supported by means of the rear springs 3 at the sides of the vehicle and the front spring 4 which rests upon a part of the truck and has a part of the body resting upon its upper part. The body is provided with an inclined bottom 5 which has a door opening 6 in its rear end and a door opening 7 is formed in the lower part of the rear of the body, the two openings communicating with each other. The opening 6 is adapted to be closed by a sliding door 8 which has rollers 9 thereon engaging a track 10 carried by the bottom. A bar 11 is connected with the door and has a rack 12 at its upper end which is engaged by a pinion 13 on a shaft 14. Said shaft is provided with a sprocket 15 over which a chain 16 passes and said chain passes over a small sprocket 17 secured to a shaft 18 which is journaled in the forward extending beams 19 carried by the front end of the body. This shaft has secured thereto a wheel 20 which is provided with the hand engaging members 21 so that the wheel and shaft can be rotated by one hand of the driver so as to raise and lower the door. The opening 7 is controlled by a door 22 which is provided with a handle 23 and said door is formed with a hollow interior, as shown at 24, for receiving a portion of the rear end of the body. This arrangement of parts permits free movement of the door 22 without interference on the part of the material in the body. A chute 25 is arranged to be moved by hand under the opening 6, said chute having flanges 26 which engage the guides 27 on the bottom of the body, the chute being held in either its operative or inoperative position by means of the hooks 28 engaging the eyes 29 on the chute. Thus the chute can be shoved upwardly under the bottom and above the opening 6, when not in use, as shown in dotted lines in Figure 1, and when it is to be used to scatter the material dropping through the opening 6 it can be moved to the position shown in full lines in Figure 1. I also provide a shaker attachment which consists of a plate 30 which is adapted to be connected to the rear end of the body by means of the hooks 31 and the springs 32 in such a manner that it forms a continuation of the inclined bottom and will receive the material passing through the opening 7, when the door 22 is raised, so as to scatter the same on the road. The springs 32 tend to give a shaking action to the plate 30 as the material passes over the same.

From the foregoing it will be seen that the door 8 can be opened and closed without the driver leaving his seat so that the material can be discharged while the wagon moves along. The chute can be used whenever necessary or desirable by simply placing it at the lower end of its guideways and by using the shaker attachment and the door 22 the material can be scattered over the road more evenly. The shaker attachment when not in use can be placed on any suitable part of the vehicle.

As will be seen the doors 8 and 22 can be opened together so as to make a wide opening for the discharge of the material, or one door can be used independently of the other. The chute 25 is used in conjunction with the door opening 6 but the door 22 can be partly opened, when the chute is in position, to increase the discharge of the material from the body onto the chute. The spreader 30, however, is only used when the material is discharging through the door opening 7.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A dump wagon comprising a body having an inclined bottom and a vertical rear, said bottom and rear having openings at their lower ends which communicate with each other, a sliding door for controlling each opening, a rack bar connected with the door on the bottom, a shaft journaled to the body, a pinion on the shaft engaging the rack bar, a shaft at the front part of the wagon, sprockets on the two shafts, a chain passing over the sprockets, a wheel on the front shaft and hand engaging projections carried by said wheel.

2. A dump wagon comprising a body having an inclined bottom and a vertical rear, said bottom and rear having openings at their lower ends which communicate with each other, a sliding door for controlling each opening, means for actuating the door for the opening in the bottom from a point adjacent the driver's seat, a chute and means for supporting the same on the bottom forwardly of the opening therein or under the opening.

In testimony whereof I affix my signature.

THOMAS DAVIDSON.